UNITED STATES PATENT OFFICE.

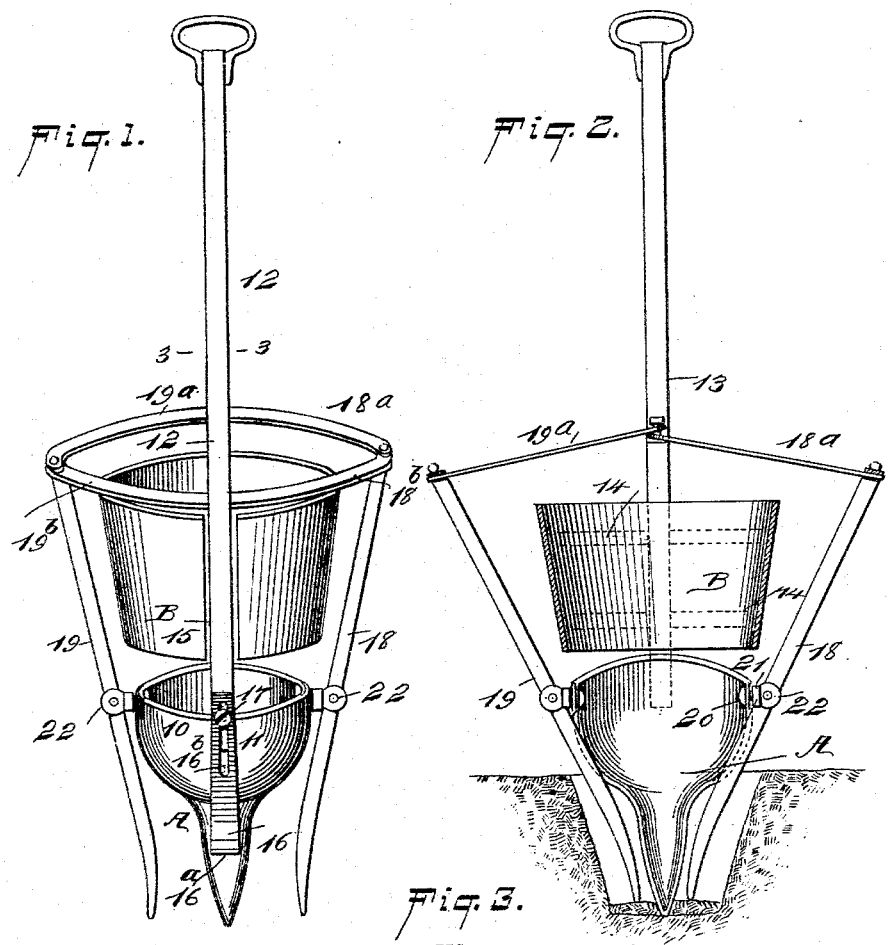

HENRY PINCKNEY MEETZE, OF PENDLETON, SOUTH CAROLINA.

TRANSPLANTER.

SPECIFICATION forming part of Letters Patent No. 533,717, dated February 5, 1895.

Application filed April 21, 1894. Serial No. 508,426. (No model.)

*To all whom it may concern:*

Be it known that I, HENRY PINCKNEY MEETZE, of Pendleton, in the county of Anderson and State of South Carolina, have invented a new and Improved Transplanter, of which the following is a full, clear, and exact description.

My invention relates to a device for setting out or transplanting plants of various kinds, and it has for its object to provide a device of exceedingly simple construction, which may be operated for a long time without unduly tiring the operator, and by which the plants to be transplanted may be expeditiously and conveniently introduced into the device and whereby the plants may be as readily and conveniently introduced into the ground and placed in the best position to facilitate speedy development, while the earth will be packed around the plants sufficiently to hold them in proper position and yet not interfere with the withdrawal of the device.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a side elevation of the improved transplanter, illustrating it in position to receive a plant. Fig. 2 is a vertical section through the transplanter, illustrating it in position for depositing or setting a plant; and Fig. 3 is a horizontal section through the handle of the transplanter, taken on the line 3—3 of Fig. 1, the body being shown in plan view.

In carrying out the invention what may be termed the body A of the transplanter is of substantially funnel shape, and the said funnel body is made in two sections 10 and 11, having a pivotal connection at their upper ends, whereby the sections may be held close together to form the perfect funnel, or whereby the sections may be divided or separated at their lower ends a predetermined distance to discharge whatever object that may have been held between them. The funnel body illustrated in the drawings comprises an upper bowl-shaped portion and a much narrower lower stem or shank section. This form of funnel is usually employed for plants having bushy tops, or plants having very large roots, but I desire it to be distinctly understood that the shape of the funnel may be varied, as for example it may be rendered more or less conical in shape, and this latter shape may be found desirable when small plants are to be transplanted or set, or plants having very long and tapering roots. Therefore, the funnel body A is detachably connected with handles 12 and 13, one handle being attached to each section of the body at the upper portion thereof, and the handles are carried upward a suitable distance, preferably in parallel lines, or substantially so, and are of sufficient length to enable a person of ordinary height to manipulate the transplanter without stooping to any great extent.

In order to facilitate the speedy introduction of the plants to be transplanted into the body or funnel of the transplanter, a guide cup B, is preferably located above the body, being attached to one of the handles by means of straps 14, shown in dotted lines in Fig. 2, or their equivalents, the opposite handle being unattached to said cup, and it is adapted to enter the cup when necessary, the cup to that end being provided with a vertical opening 15 in its side facing the unattached handle, as illustrated in Fig. 1. This cup is open at both top and bottom, and is rendered more or less tapering in a downward direction in order that the plants placed in the cup may be guided directly into the funnel body. A gage 16 may also be attached to the lower portion of the handles as illustrated in Fig. 1, in which the gage is shown as provided with a foot $16^a$, adapted for contact with the ground, and a slot $16^b$ in its shank or body, the gage being adjustably connected with the handle by a set screw 17, which passes through the slot and into the handle.

Packing arms 18 and 19, are located at the pivot portions of the funnel body sections. Therefore, the lower ends of these arms, which are preferably more or less flattened, are opposite the space between the two sections of the body, and when the sections separate the packing arms may be carried inward between the two body sections. The lower portions of the packing arms are preferably curved in an inwardly direction, and the upper ends of the packing arms, which extend beyond the top of the cup B and outside of said cup, are attached to segmental links, the arm 18 having two such links 18<sup>a</sup> and 18<sup>b</sup> pivotally connected with its upper end, while the opposing arm 19 is similarly equipped with two segmental links 19<sup>a</sup> and 19<sup>b</sup>, and corresponding links on both of the arms are pivotally connected with the handles 12 and 13, whereby when the handles are forced apart the connected links will assume the form of a circle, as shown in dotted lines in Fig. 3 and in positive lines in Fig. 1, the circle being greater than the upper diameter of the cup B. When, however, the handles are pressed together, thereby opening the sections of the body to deposit the plant carried thereby into the ground, the packing arms, which were entered into the ground with the funnel body, will move inwardly or in direction of one another, and in that manner carry with them earth, packing the same around the roots of the plant in sufficient quantities to maintain the plant in upright or proper position, ample space being left for the withdrawal of the device.

The packing arms are preferably connected to the body in the manner shown in the drawings, in which it will be observed that the pivot pins 20 utilized to pivotally connect the body sections together, are each provided with a nut 21 carrying wings 22, and the packing arms are made to pass between these wings and are pivotally attached thereto.

The device may be used for dropping seed into hills if in practice it is found desirable, as through its means the seed may be dropped to any desired depth and immediately covered.

It will be readily observed that a plant can be set by means of this device practically at a single stroke. The plant is dropped into the funnel body while it is closed, or in the position shown in Fig. 1. The said body is then introduced into the ground the predetermined distance, until for example the gage 16 strikes the surface. The handles are then brought together or closed, and the funnel body will create an opening or space to receive the plant, at the same time releasing it, while the packing arms will simultaneously operate to deposit earth around the roots, and the device may then be lifted out of the ground, the entire operation being accomplished almost instantly, and with practically but an inward and upward movement of the hands.

It will be observed by reference to Fig. 1, that as the handles are being closed the upper portion of the funnel body opens, and the earth is thereby packed firmly around the roots of the plants, while the soil at the surface remains loose, which conditions materially aid the plant in growing. It is also evident that a small cavity or sink will be formed around the plant, which will aid in watering and in cultivating the plant while it is small.

Having thus described my invention, I claim as new and desire to secure by Letters Patent—

1. A transplanter comprising two vertically extending handle bars adapted to be grasped at their upper ends by the operator, hinged body sections rigidly secured to the lower ends of the handle bars at right angles to their pivotal points and pivoted packers working in the plane which divides the two body sections and operatively connected together and to the handle bars above the said body, substantially as described.

2. A transplanter, the same consisting of a funnel shaped body constructed in pivoted sections adapted to open at their lower ends, a handle rigidly attached to each of said sections between its pivotal points and extending upwardly therefrom, whereby when the handles are carried together the sections of the funnel body will be opened at their lower ends, packing arms operating at each side of the body opposite the division therein hinged to the body at the hinging points thereof, and a connection between the packing arms and handles above the body, whereby when the body sections are carried outwardly at their lower ends by the inward movement of the handles the lower ends of the packing arms will be simultaneously carried in an inwardly direction, as and for the purpose set forth.

3. In a transplanting device, a funnel shaped body constructed in sections pivotally connected at their upper ends, a handle rigidly attached to each section between its pivotal points and extending in an upwardly direction therefrom, whereby when the handles are brought together the lower portion of the sections will be opened, a gage carried by the body, and packing arms pivoted upon the body at its two pivotal points, operating at each side thereof in an opposite direction to the body sections, and link connections between the packing arms and the handles above the body, as and for the purpose specified.

4. In a transplanter, the combination, with a tapering body constructed in two sections pivotally connected at their upper ends, and handles attached to each section and extending upwardly therefrom, the handles being adapted to be brought together to open the sections at their lower ends, of packing arms pivoted upon the body sections at their pivotal connections, the packing arms being located outside of the packing sections, extending downward and inward, one at each side of the body opposite the opening between the sections, and two segmental links connected with the upper portion of each arm, corresponding links of the two sets being pivotally connected with opposing handles, substantially as shown and described.

5. In a transplanter, the combination, with a tapering body constructed in two sections pivotally connected at their upper ends, a handle attached to each section and extending upwardly therefrom, the handles being adapted to be brought together to open the sections at their lower ends, of packing arms pivoted upon the body sections at their pivotal connections, the packing arms being located upon the outside of the packing sections, extending downward and inward, one at each side of the body opposite the opening between the sections, two segmental links connected with the upper portion of each arm, corresponding links of the two sets being pivotally connected with opposing handles, and a guide cup carried by one of the handles above the tapering body of the device, the said cup being carried by one of the handles, as and for the purpose specified.

HENRY PINCKNEY MEETZE.

Witnesses:
E. G. EVANS, Jr.,
W. T. GLENN.